(12) United States Patent
Watanabe et al.

(10) Patent No.: US 8,531,769 B2
(45) Date of Patent: Sep. 10, 2013

(54) DISPERSION ELEMENT, SPECTRAL DEVICE, AND WAVELENGTH SELECTIVE SWITCH

(75) Inventors: Satoshi Watanabe, Tokyo (JP); Takehiro Yoshida, Hachioji (JP); Toshiro Okamura, Hino (JP)

(73) Assignee: Olympus Corporation, Tokyo (JP)

( * ) Notice: Subject to any disclaimer, the term of this patent is extended or adjusted under 35 U.S.C. 154(b) by 463 days.

(21) Appl. No.: 12/895,001

(22) Filed: Sep. 30, 2010

(65) Prior Publication Data

US 2011/0080642 A1  Apr. 7, 2011

(30) Foreign Application Priority Data

Oct. 6, 2009 (JP) .................. 2009-232447

(51) Int. Cl.
*G02B 5/18*  (2006.01)
*G02B 27/14*  (2006.01)
*H04J 14/02*  (2006.01)

(52) U.S. Cl.
USPC ........................ 359/572; 359/634; 398/87

(58) Field of Classification Search
USPC ................. 359/572, 634; 398/84, 87
See application file for complete search history.

(56) References Cited

U.S. PATENT DOCUMENTS 5,625,499 A * 4/1997 Chen ........................... 359/831
6,707,959 B2   3/2004 Ducellier et al.

* cited by examiner

*Primary Examiner* — Alessandro Amari
(74) *Attorney, Agent, or Firm* — Scully, Scott, Murphy & Presser, P.C.

(57) ABSTRACT

A dispersion element includes a prism having a first transmission surface and an oppositely disposed second transmission surface, and an optical element having a third transmission surface and an oppositely disposed diffraction optical surface on which a diffraction grating is arranged. The prism and the optical element are integrated into one body by cementing the first transmission surface to the third transmission surface. The third transmission surface and the diffraction optical surface are non-parallel to each other in a plane perpendicular to grooves of the diffraction grating.

8 Claims, 17 Drawing Sheets

166

PRIOR ART

PRIOR ART

DISPERSION ELEMENT, SPECTRAL DEVICE, AND WAVELENGTH SELECTIVE SWITCH

CROSS-REFERENCE TO RELATED APPLICATIONS

The present application is based upon and claims the benefit of priority from the prior Japanese Patent Application No. 2009-232447 filed on Oct. 6, 2009; the entire contents of which are incorporated herein by reference.

BACKGROUND OF THE INVENTION

1. Field of the Invention

The present invention relates to a dispersion element, a spectral device, and a wavelength selective switch.

2. Description of the Related Art

A method for manufacturing an immersion grating (dispersion element) is disclosed in "Low polarization dependent diffraction grating for wavelength demultiplexing, E. Popov et al., Optics Express, Vol. 12, Issue 2, pp. 269-275." In this method, a grating pattern is formed on a silicon wafer by using a phase shift mask, and then grooves are formed by means of crystallographic etching (tetramethylammonium hydroxide crystallographic etching) using tetramethylammonium. These grooves are finely etched on one side of the wafer that is an extremely high-precision plane parallel plate. Hereinafter, a silicon wafer on which grooves are formed is called a chip.

As a conventional wavelength selective switch, a reflective wavelength selective switch is disclosed in the specifications of U.S. Pat. No. 6,707,959.

FIGS. 16 and 17 are schematic views illustrating how light passes inside a conventional immersion grating (dispersion element). In the conventional immersion grating shown in FIGS. 16 and 17, a side surface 921 of a separately provided prism 920 is cemented to a surface 902 without grooves of a chip 900. On the chip 900, the grooves are formed on a surface 901 arranged opposite to the cemented surface 902. In this immersion grating, light is input from another side surface 922 of the prism 920.

However, conventional cementing medium cannot be used to cement the chip and the prism. This is because an appropriate cementing medium does not exist due to the fact that the refractive index of silicon is higher than 3 in the wavelength of near infrared rays.

Therefore, for cementing the chip and the prism, it is desirable to use a normal temperature cementing such as optical contact and activated cementing.

The most part of a light L80 or a light L90 that enters the immersion grating shown in FIG. 16 or 17 are dispersed at the surface 901, which is a diffraction plane, after that, enters the prism 920 without reflection at the surface 902 and the side surface 921, which function as a cementing surface where the chip 900 and the prism 920 that are cemented together, and is launched from the side surface 922 that functions as both an incident surface and an output surface. The light L81 (solid line in FIG. 16) or the light L91 (solid line in FIG. 17) that is launched from the side surface 922 is called an ordinary light.

When the cementing between the chip 900 and the prism 920 is not perfect and foreign substances such as impurities enter the cementing surface, a part of light that passes through the cementing surface and is dispersed at the surface 901 is reflected at the cementing surface even when the medium on both the sides of the cementing surface is the same. Out of the light reflected on the cementing surface, the light L81 (solid line in FIG. 16) or the light L91 (solid line in FIG. 17) that has diffracted only once at the diffraction plane 901 is launched in the same direction as that of the ordinary light L81 or L91 from the side surface 922 of the prism 920. The light L81 or L91 that is launched from the side surface 922 after being reflected at the cementing surface is called a noise light.

When such an immersion grating is used in a spectral device having a detector array, the ordinary light and the noise light travel in parallel after being launched from the immersion grating, converge by a lens or a reflected light system, and both of them enter the same detector.

When the immersion grating is used for a wavelength selective switch, both the ordinary light and the noise light enter a switching element of the same channel.

When a coherent light is used as an incident light for the immersion grating, because the ordinary light (signal light) and the noise light have an optical path difference, the ordinary light and the noise light cause interference leading to an intensity modulation. Moreover, because the optical path difference differs depending on the wavelength, the intensity changes depending on the wavelength. This phenomenon is undesirable for a spectral device or a wavelength selective switch.

Moreover, this phenomenon occurs not only at a cementing surface of silicon medium, but also at a cementing surface of high refractive index optical mediums as well.

SUMMARY OF THE INVENTION

The present invention has been made in view of the above discussion. It is an object of the present invention to provide a dispersion element with which an output light does not cause intensity modulation when wavelength is changed, as well as a spectral device and a wavelength selective switch that include the dispersion element.

To solve the above objects and to achieve the above objects, a dispersion element according to an aspect of the present invention includes a prism having a first transmission surface and an oppositely disposed second transmission surface, and an optical element having a third transmission surface and an oppositely disposed diffraction optical surface on which a diffraction grating is formed. The prism and the optical element are integrated into one body by cementing the first transmission surface to the third transmission surface, and the third transmission surface and the diffraction optical surface are formed in non-parallel with each other in a plane perpendicular to grooves of the diffraction grating.

In the dispersion element according to another aspect of the present invention, the diffraction optical surface is a reflective type, and it is preferable that an angle $\Delta\theta$ between the third transmission surface and the diffraction optical surface satisfies Expression (1):

$$\lambda/(nW) < \Delta\theta < \alpha \qquad (1)$$

where $\lambda$ is wavelength in use, n is a refractive index of a medium of the optical element, W is an effective length in a direction perpendicular to the grooves on the diffraction optical surface, and $\alpha$ is an apex angle of the prism.

In the dispersion element according to still another aspect of the present invention, the diffraction optical surface is a reflective type, and it is preferable that an angle $\Delta\theta$ between the third transmission surface and the diffraction optical surface satisfies Expression (2):

$$|(m\Delta\lambda)/(nd)| < \Delta\theta < \alpha \qquad (2)$$

where m is a diffraction order of a diffraction caused by the optical element, $\Delta\lambda$ is a difference of wavelength resolved by the dispersion element, n is a refractive index of a medium of the optical element, d is a pitch of grooves formed on the optical element, and α is an apex angle of the prism.

A spectral device according to still another aspect of the present invention includes an input portion through which light enters; a dispersion element disposed at a light output side of the input portion; a plurality of light receiving portions corresponding to respective wavelengths of light dispersed by the dispersion element; and an optical system disposed between the dispersion element and the light receiving portions. The dispersion element is a dispersion element according to the above mentioned aspects.

A wavelength selective switch according to still another aspect of the present invention includes at least one input portion for inputting wavelength-multiplexed light in the wavelength selective switch; a dispersion element for receiving the light from the input portion and dispersing the light; a light collecting component for collecting light for each dispersed wavelength; a light deflection member having a plurality of deflection elements capable of deflecting the light of each wavelength from the light collecting component independently for each wavelength; and an output portion for receiving the light of each wavelength deflected by the light deflection member. The dispersion element is a dispersion element according to the above mentioned aspects.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are described below in detail with reference to the accompanying drawings. The present invention is by no means limited to the following embodiments.

Figure 1:
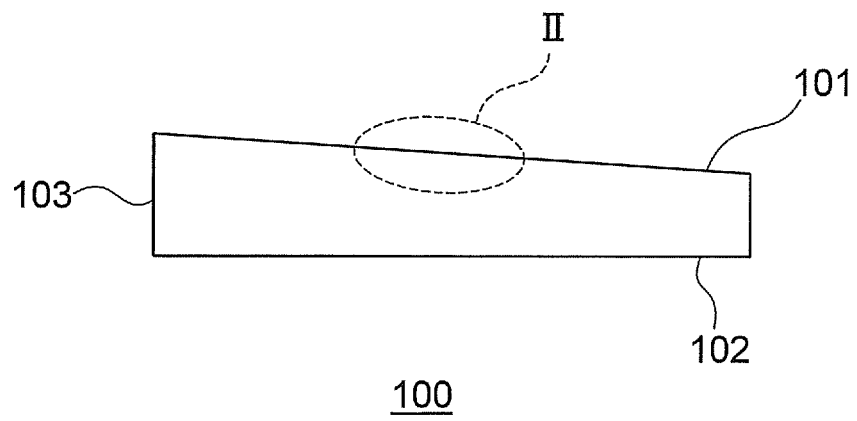
FIG. 1 is a side view of a structure of a chip according to an embodiment of the present invention.
Figure 2:
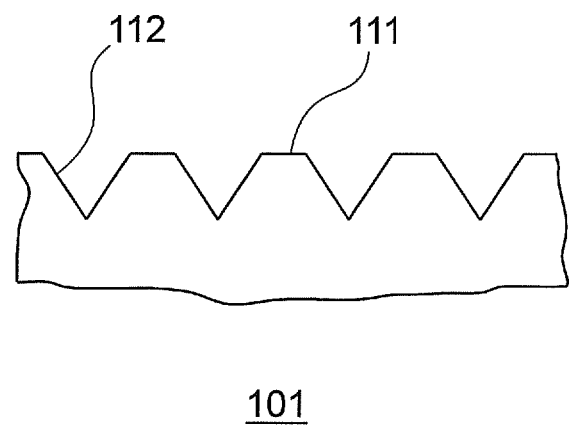
FIG. 2 is an enlarged side view of a part II shown in FIG. 1.
Figure 3:
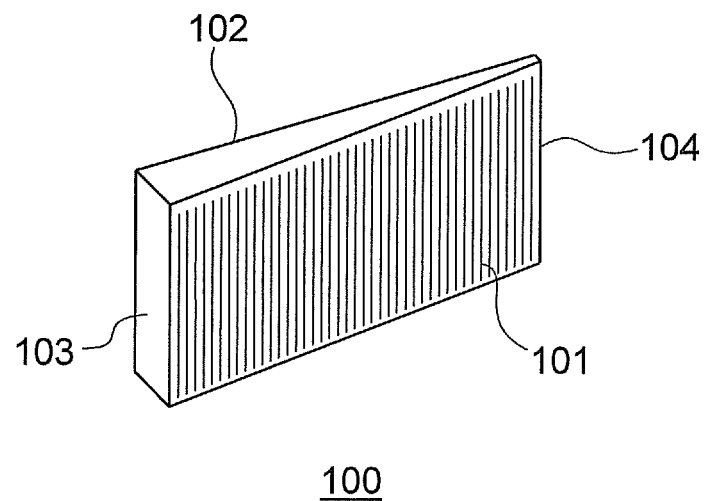
FIG. 3 is a perspective view of a structure of the chip according to the embodiment of the present invention.

FIG. 1 is a side view of a structure of a chip 100 as a dispersion element according to an embodiment of the present invention. FIG. 2 is an enlarged side view of a part II shown in FIG. 1. FIG. 3 is a perspective view of a structure of the chip 100 according to the embodiment of the present invention.

The chip 100 is, for example, a silicon wafer, and includes a first plane 101 and a second plane 102 (a third transmission surface). The first plane 101 and the second plane 102 are obtained by machining two flat and parallel planes. The first plane 101 and the second plane 102 are non-parallel, such that they come closer as they get away from a bottom plane 103. Grooves 112 that are parallel to each other are formed on the first plane 101 (see FIG. 2). The grooves 112 (diffraction grating) are formed by performing crystallographic etching using tetramethylammonium hydroxide after applying a grating pattern on a surface 111 (see FIG. 2) of the first plane 101 by using a phase shift mask. A shape of the grooves 112 is decided depending on characteristics of the dispersion element. For example, a pitch is 0.4 μm and a height (length in the horizontal direction in FIGS. 1 and 2) of area with the grooves 112 is 14 mm.

After forming the grooves, a gold coating is applied to the first plane 101. In addition, the second plane 102 is polished so that the plane makes a predetermined tilt angle relative to an axis parallel to the grooves 112 on the chip 100. Thus, the chip 100 is made wedge-shaped (see FIG. 3). A vertex angle of an apex 104 of the wedge-shaped chip 100 is, for example, 0.2 degree.

Figure 4:
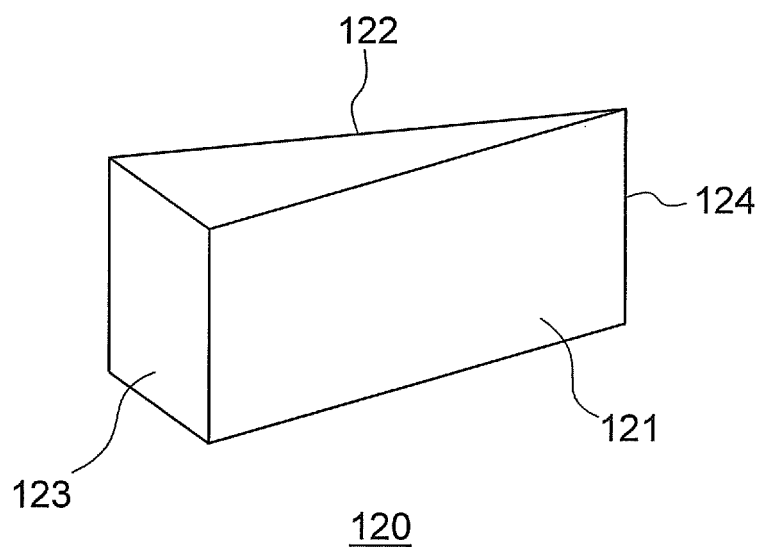
FIG. 4 is a perspective view of a structure of a prism according to the embodiment of the present invention.

FIG. 4 is a perspective view of a structure of a prism 120 according to the embodiment of the present invention. The prism 120 shown in FIG. 4 made from a medium and has a shape appropriate to the chip 100. When a silicon wafer with the vertex angle of the apex 104 specified to 0.2 degree as described above is used as the chip 100, it is desirable that the prism 120 has a wedge shape so that a first plane 121 (a first transmission surface) and a second plane 122 (a second transmission surface) come closer with each other as they get away from a bottom plane 123, and that the vertex angle of an apex 124 is 35 degrees and the chip 100 is made of silicon. In the chip 100 and the prism 120, total reflection of incident light can be suppressed by using the same medium or combining mediums with a small refractive index difference.

Figure 5:
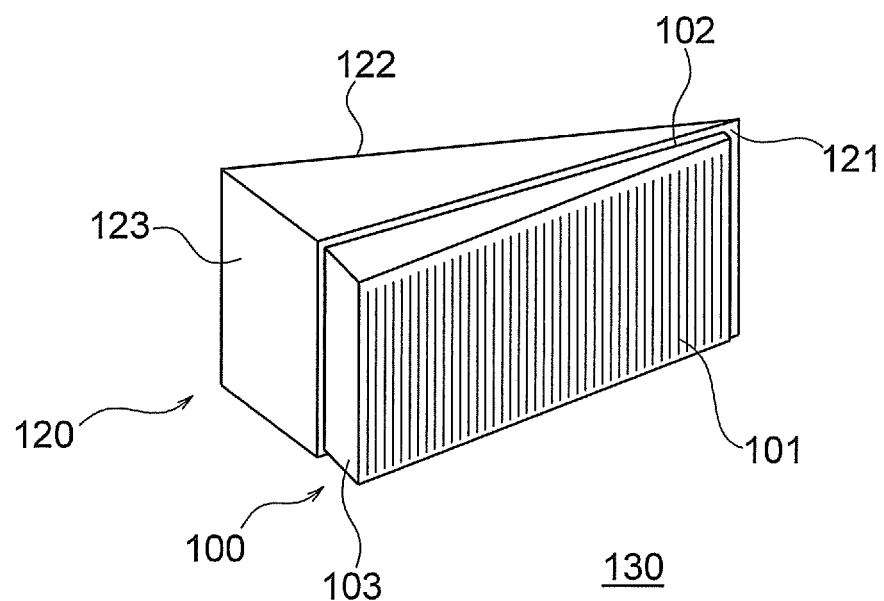
FIG. 5 is a perspective view of an exemplary structure of a dispersion element according to the embodiment of the present invention.

FIG. 5 is a perspective view of an exemplary structure of a dispersion element 130 according to the embodiment. The second plane 102 and the first plane 121 are cemented to each other by an ordinary temperature cementing method such as optical contact and activated cementing (see FIG. 5). As shown in FIG. 5, when performing the cementing, not only the bottom plane 103 of the chip 100 is made to correspond to the bottom plane 123 of the prism 120 but also the apex 104 of the chip 100 is made to correspond to an apex 124 of the prism 120. Contrarily, as shown in FIG. 6, it is possible to make not only the apex 104 of the chip 100 correspond to the bottom plane 123 of the prism 120 but also to make the bottom plane 103 of the chip 100 correspond to the apex 124 of the prism 120.

Figure 6:
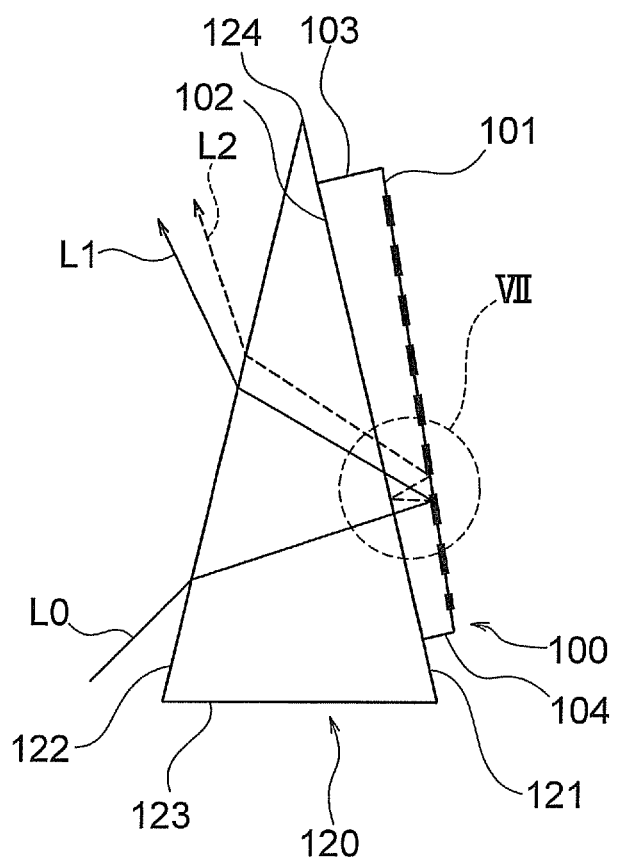
FIG. 6 is a schematic view showing how a light travels inside the dispersion element according to the embodiment of the present invention.
Figure 7:
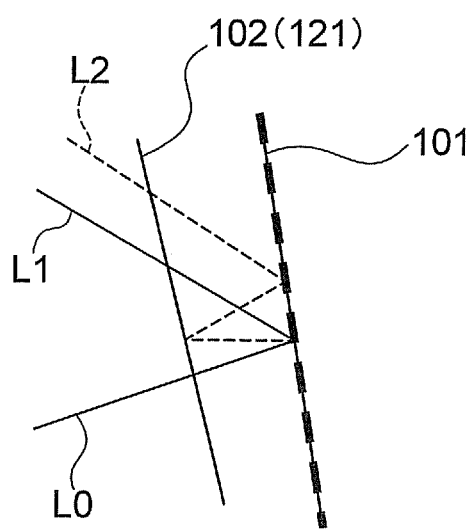
FIG. 7 is a schematic view showing the part VII of FIG. 6 enlarged.

The characteristics of the dispersion element (hereinafter, may be called as immersion grating) obtained by cementing as shown in FIG. 6 will be explained below with reference to FIGS. 6 and 7. FIG. 6 is a schematic view showing how a light travels inside the dispersion element according to the embodiment. FIG. 7 is an enlarged schematic view of a part VII shown in FIG. 6.

A light ray L0 entering from the second plane 122, which is the transmission surface of the prism 120, passes through the second plane 102, which is the cementing surface of the chip 100, and separates into a diffracting component L1 and a regularly reflecting component L2 at the first plane 101, which is a reflecting diffraction optical surface of the chip 100. The diffracting component L1 is called an ordinary light and it is shown with a solid line in FIGS. 6 and 7. The ordinary light L1 again passes through the cementing surface 102 and it is output from the transmission surface 122 to the outside of the immersion grating.

The component L2 regularly reflected at the reflecting diffraction optical surface 101 and separated from the ordinary light L1 will be called as a noise light. A part of the noise light L2 is further reflected at the cementing surface 102. This reflected component L2 again travels toward the reflecting diffraction optical surface 101. The most part of the component L2 travelling toward the reflecting diffraction optical surface 101 is further diffracted thereat. The noise light L2 is shown with a broken line in FIGS. 6 and 7.

In short, the noise light L2 is regularly reflected two more times compared with the ordinary light L1. Because the cementing surface 102 on which specular reflection occurs two times and the reflecting diffraction optical surface 101 are not parallel, angles of incidence for the ordinary light L1 and the noise light L2 onto the transmission surface 122 are different. Therefore, the angles of the ordinary light L1 and the noise light L2 when they are output from the transmission surface 122 are different, and even if these lights are collected by some optical means such as a lens, which is not shown, they converge at different points. For this reason, because the ordinary light L1 and the noise light L2 do not overlap, intensity modulation does not occur.

Next, the wedge angle (vertex angle of the apex 104 of the chip 100) is explained with reference to FIG. 8.

Figure 8:
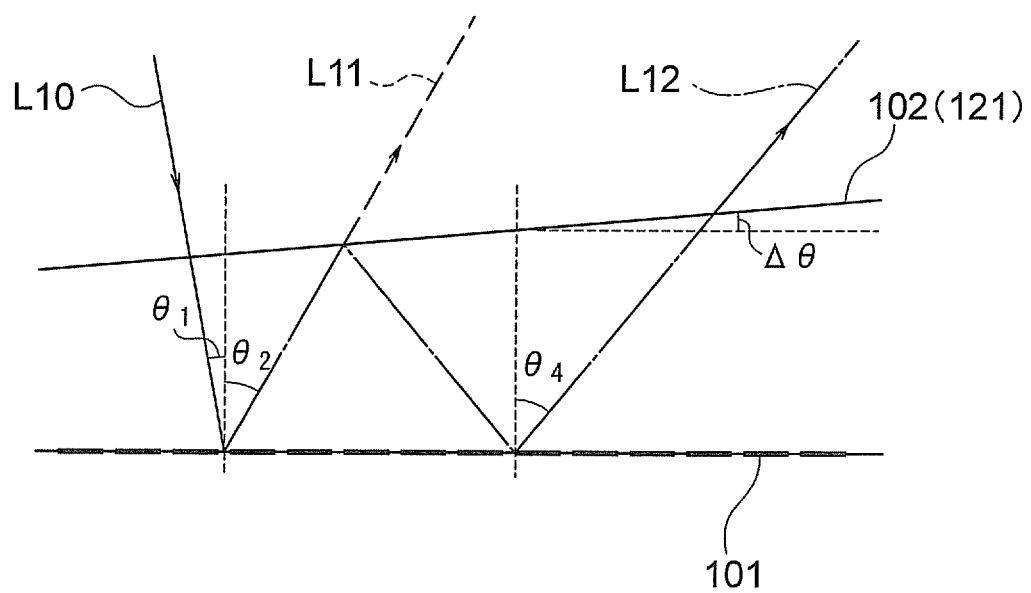
FIG. 8 is an enlarged schematic view showing an example of how a light travels inside the dispersion element according to the embodiment of the present invention.

FIG. 8 is an enlarged schematic view showing an example of how a light travels inside the dispersion element according to the embodiment. FIG. 8 illustrates the behavior of a light ray near the reflecting diffraction optical surface 101 and the cementing surface 102.

Assume that an angle between the cementing surface 102 and the reflecting diffraction optical surface 101 is $\Delta\theta$ (rad). In a space filled with a medium of an absolute refractive index n, incident light L10 with a wavelength $\lambda$ in vacuum passes through the cementing surface 102 and falls on the reflecting diffraction optical surface 101 at an angle of incidence $\theta_1$. The incident light diffracted by the reflecting diffraction optical surface 101 at a diffraction angle $\theta_2$ passes through the cementing surface 102 and it is separated into two components. One of them is a component that passes through the cementing surface 102 as the ordinary light L11, and the other component if the noise light L12 that is reflected at the cementing surface 102 and further regularly reflected at the reflecting diffraction optical surface 101 at a reflection angle $\theta_4$ to pass through the cementing surface 102.

Assume that the wavelengths of two lights desired to separate are $\lambda$ and $\lambda+\Delta\lambda$, respectively. Let a diffraction angle when the light of wavelength $\lambda+\Delta\lambda$ is diffracted at the reflecting diffraction optical surface 101 to become the ordinary light L11 be $\theta_3$ (not shown). Let a diffraction order be m, a pitch of the grating be d, a refractive index be n, and assume that n does not change at the wavelengths $\lambda$ and $\lambda+\Delta\lambda$ ($\Delta\lambda>0$), the following Equalities (3) and (4) hold from the diffraction equation:

$$n \sin \theta_1 - n \sin \theta_2 = (m\lambda)/d \tag{3}$$

$$n \sin \theta_1 - n \sin \theta_3 = [m(\lambda+\Delta\lambda)]/d \tag{4}$$

From Equalities (3) and (4), $$\sin \theta_3 - \sin \theta_2 = -(m\Delta\lambda)/(nd) \tag{5}$$

where, let $0<\theta_1<\theta_2$, then m<0 and the right side of Expression (5) becomes positive, so the following Expression holds:

$$0<\theta_1<\theta_2<\theta_3$$

In addition, in the following Expression:

$$\sin \theta_4 = \sin(\theta_2+2\Delta\theta)$$

let $|2\Delta\theta|<<1$, then the above Expression becomes:

$$\sin \theta_4 = \sin \theta_2 + 2\Delta\theta \cos \theta_2$$

Furthermore, the above Expression can be transformed to the following Expression (6).

$$\sin \theta_4 - \sin \theta_2 = 2\Delta\theta \cos \theta_2 \tag{6}$$

From the above Equalities (5) and (6), the following Expression (7) can be derived:

$$\sin \theta_4 - \sin \theta_3 = 2\Delta\theta \cos \theta_2 + [(m\Delta\lambda)/(nd)] \tag{7}$$

where, if $$\theta_2<\theta_3<\theta_4$$

is satisfied, since the ordinary light of wavelength $\lambda$ and the noise light do not mix, from Expression (7), $$2\Delta\theta \cos \theta_2 + [(m\Delta\lambda)/(nd)]>0$$

is obtained. Therefore, the following Expression (8) holds:

$$\Delta\theta > -(m\Delta\lambda)/(2nd \cos \theta_2) \tag{8}$$

Figure 9:
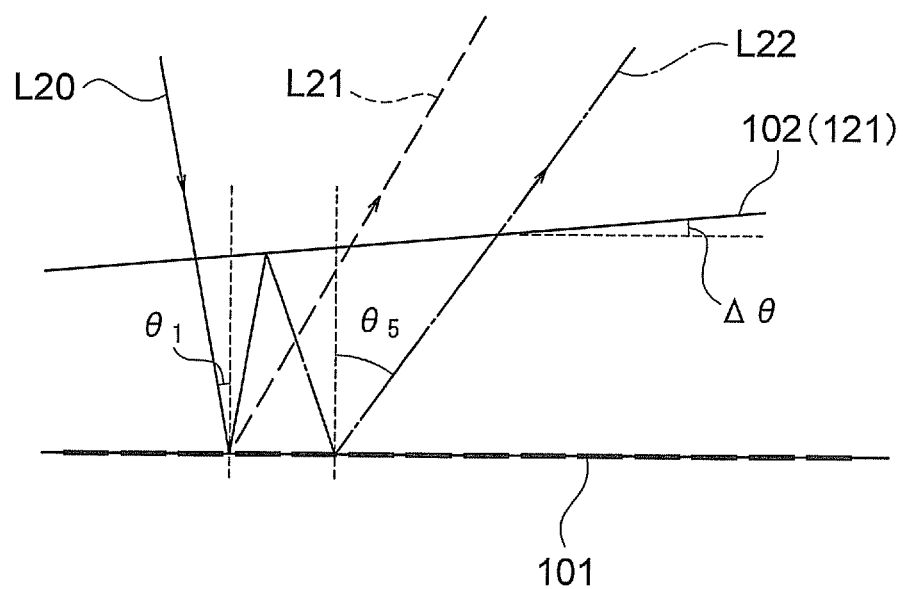
FIG. 9 is an enlarged schematic view showing another example of how a light travels inside the dispersion element according to the embodiment of the present invention.

Next, the wedge angle is explained for another case in which a noise light arise with reference to FIG. 9. FIG. 9 is an enlarged schematic view showing another example of how a light travels inside the dispersion element according to the embodiment.

Also in this example, let the angle between the cementing surface 102 and the reflecting diffraction optical surface 101 be $\Delta\theta$. In a space filled with a medium of the refractive index n, an incident light L20 with the wavelength $\lambda$ in vacuum passes through the cementing surface 102 and enters the reflecting diffraction optical surface 101 at an angle of incidence $\theta_1$. This incident light L20 separates mainly into two components L21 and L22. One of them is a component that is diffracted at reflecting diffraction optical surface 101 at a diffraction angle $\theta_2$ and passes through the cementing surface 102 to become the ordinary light L21 and the other component is regularly reflected at the reflecting diffraction optical surface 101, further regularly reflected at the cementing surface 102, again enters the reflecting diffraction optical surface 101 at an angle $\theta_1+2\Delta\theta$, is diffracted at an diffraction angle $\theta_5$, and passes through the cementing surface 102 to become the noise light L22.

Assume that the wavelengths of two lights desired to separate are $\lambda$ and $\lambda+\Delta\lambda$, respectively. Let a diffraction angle when the light of wavelength $\lambda+\Delta\lambda$ is diffracted at the reflecting diffraction optical surface 101 to become the ordinary light L21 be $\theta_3$ (not shown). Moreover, let a diffraction order be m, a pitch of the grating be d, a refractive index be n, and assume that n does not change at the wavelengths $\lambda$ and $\lambda+\Delta\lambda$ ($\Delta\lambda>0$). The above Expression (4) holds also in this case. From the diffraction equation for the noise light L22, $$n \sin(\theta_1+2\Delta\theta)-n \sin \theta_5=(m\lambda)/d$$

is obtained, and let $$|2\Delta\theta|<<1$$

then the following Expression (9) holds:

$$\sin \theta_1+2\Delta\theta \cos \theta_1-\sin \theta_5=(m\lambda)/(nd) \qquad (9)$$

From the above Equalities (4) and (9), the following Expression (10) can be derived:

$$\sin \theta_5-\sin \theta_3=2\Delta\theta \cos \theta_1+[(m\Delta\lambda)/(nd)] \qquad (10)$$

where, when $\theta_2<\theta_3<\theta_5$ is satisfied, since the ordinary light L21 of wavelength $\lambda$ and noise light L22 do not mix with each other, from Expression (10), $$2\Delta\theta \cos \theta_1+[(m\Delta\lambda)/(nd)]>0$$

is obtained. Therefore, the following Expression (11) holds:

$$\Delta\theta>-(m\Delta\lambda)/(2nd \cos \theta_1) \qquad (11)$$

A case is considered where $\Delta\lambda$ in Inequalities (8) and (11) is the minimum $\Delta\lambda_0$ that can be dispersed by a diffraction grating.

First, it is known that wavelength resolution R of the diffraction grating satisfies the following Expression (12) by letting effective groove numbers on the grating be N:

$$R=|mN| \qquad (12)$$

Moreover, generally, the wavelength resolution R can be defined by the following Expression (13):

$$R=\lambda/(\Delta\lambda_0) \qquad (13)$$

Furthermore, let width of area with grooves be W, the following Expression (14) holds:

$$W=Nd \qquad (14)$$

From Equalities (12), (13), and (14), the following Expression (15) can be derived:

$$|(m\Delta\lambda_0)/d|=\lambda/W \qquad (15)$$

where, when Expression (15) is substituted in Expression (11), the following Expression (16) is obtained:

$$\Delta\theta>\lambda/(2nW \cos \theta_1) \qquad (16)$$

Furthermore, when Expression (15) is substituted in Expression (8), the following Expression (17) is derived:

$$\Delta\theta>\lambda/(2nW \cos \theta_2) \qquad (17)$$

Let the values of $\theta_1$ and $\theta_2$ in Inequalities (16) and (17) actually realized be about 0 degree to 60 degrees, the following Expression (18) holds:

$$\lambda/(nW)<\Delta\theta \qquad (18)$$

When the dispersion element according to the embodiment has a wedge angle $\Delta\theta$ that satisfies Expression (18), the ordinary light L21 and the noise light R22 will never overlap with each other in the wavelength resolution defined by Expression (12).

On the other hand, the wedge angle determines the shape of the original immersion grating, but never exceeds the apex angle $\alpha$ (rad) of the prism 120. Therefore, let the apex angle of the prism be $\alpha$, then the following Expression (19) holds.

$$\Delta\theta<\alpha \qquad (19)$$

From Inequalities (18) and (19), the following Expression (1) is derived:

$$\lambda/(nW)<\Delta\theta<\alpha \qquad (1)$$

In addition, when the wavelengths of two lights desired to separate are predetermined as $\lambda$ and $\lambda+\Delta\lambda$, the following Expression (20) is derived from Inequalities (8) and (11) by taking the fact that the values of $\theta_1$ and $\theta_2$ actually realized are about 0 degree to 60 degrees into consideration.

$$\Delta\theta>|(m\Delta\lambda)/(nd)| \qquad (20)$$

From Inequalities (19) and (20), the following Expression (2) is obtained:

$$|(m\Delta\lambda)/(nd)|<\Delta\theta<\alpha \qquad (2)$$

In Expression (2), upper limit of the wedge angle is preferably set to less than $\alpha/10$ and more preferably set to $\alpha/30$. Moreover, the upper limit is further preferably set to $\alpha/100$.

If the shape and medium of the dispersion element are designed so that the angle $\Delta\theta$, which is the wedge angle, between the cementing surface 102 and the reflecting diffraction optical surface 101 satisfy Inequalities (1) and (2), the noise light L22 of the wavelength $\lambda$ passes a position that is away from that of the ordinary light of the wavelength $\lambda+\Delta\lambda$ from the ordinary light L21 of the wavelength $\lambda$. For this reason, the ordinary light L21 does not cause such interference as the intensity modulation.

For example, let $\lambda=1.55$ μm, n=3.45, W=14 mm, and $\alpha=35$ degrees=$35\pi/180$ (rad), then $\lambda/(nW)$ of Expression (1) becomes about $3.2\times10^{-5}$. On the other hand, from $\Delta\theta=0.2$ degree=$0.2\pi/180$ (rad), $\Delta\theta$ is about $3.5\times10^{-3}$. Therefore, these values satisfy $\lambda/(nW)<\Delta\theta$ of the left side of Expression (1). On this occasion, $\Delta\theta<\alpha$ of the right side of Expression (1) is also satisfied.

Moreover, let m=−1, $\Delta\lambda=0.8$ nm, n=3.45, d=400 nm, and $\alpha=35$ degrees=$35\pi/180$ (rad), then $|(m\Delta\lambda)/(nd)|$ of Expression (2) becomes about $5.8\times10^{-4}$. On the other hand, because $\Delta\theta=0.2$ degree=$0.2\pi/180$, $\Delta\theta$ becomes about $3.5\times10^{-3}$, making it clear that $|(m\Delta\lambda)/(nd)|<\Delta\theta$ of the left side of Expression (2) is satisfied. On this occasion, $\Delta\theta<\alpha$ of the right side of Expression (2) is also satisfied.

In FIGS. 8 and 9, examples of emerging the noise lights L12 and L22 in different case for the ordinary lights L11 and L21 that cause one times m-th order diffraction on the reflecting diffraction optical surface 101 are illustrated. In each case, a light ray makes two round trips between the cementing surface 102 and the reflecting diffraction optical surface 101 to cause one-time m-th order diffraction and one times regular reflection (that is, 0-th order diffraction) at the reflecting diffraction optical surface 101.

On the other hand, the noise light may emerge in a case different from that shown in FIG. 8 or FIG. 9. Such a case occurs, for example, in a case that a light ray makes three round trips between the cementing surface 102 and the reflecting diffraction optical surface 101 to cause one time m-th order diffraction and two times specular reflection (that is, 0-th order diffraction) at the reflecting diffraction optical surface 101. By designing the dispersion element so that the angle between the cementing surface 102 and the reflecting diffraction optical surface 101 is equal to the angle $\Delta\theta$, the noise can be propagated in a direction different from that of the ordinary light thereby preventing the intensity modulation.

In addition, in a case when the noise light makes two round trips between the cementing surface 102 and the reflecting diffraction optical surface 101 but causes one time m-th order diffraction and one time 1st order diffraction where m is not equal to 1, because the diffraction angle of the noise light is different from that of the ordinary light, interference such as intensity modulation does not occur even if the angle $\Delta\theta$ between the cementing surface 102 and the reflecting diffraction optical surface 101 is not secured.

In the above example, although the wedge angle of the chip is 0.2 degree, the angle is not limited to this value but any value that satisfies Inequalities (1) and (2) is permissible. In addition, the medium of the chip 100 and the prism 120 are also not limited to silicon but any optical medium having a transparent property for the light of wavelength in use can be used.

Figure 10:
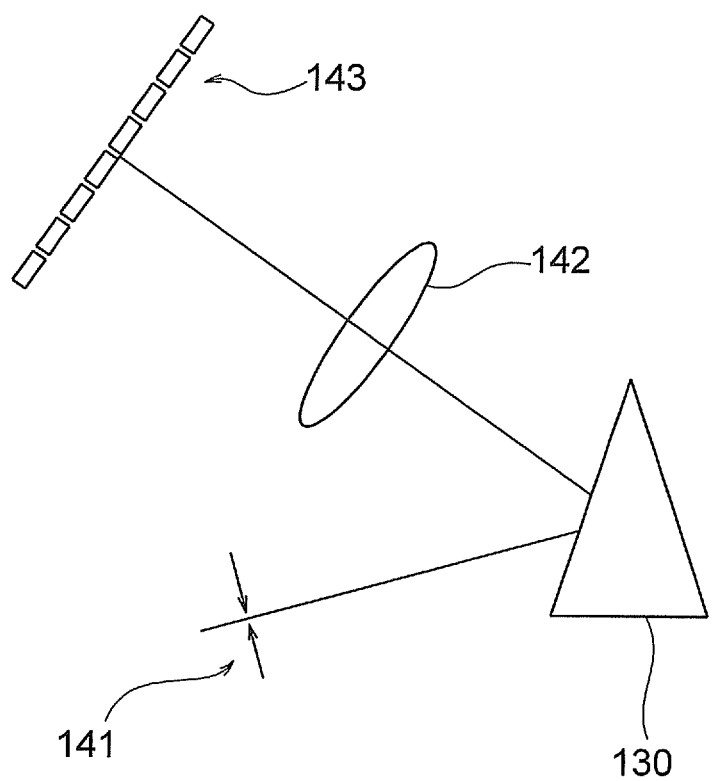
FIG. 10 is a schematic view of a configuration of a spectral device that includes a dispersion element according to the embodiment of the present invention.

Next, a spectral device according to an embodiment is explained with reference to FIG. 10. FIG. 10 is a schematic view of a configuration of a spectral device that employs a dispersion element according to the embodiment.

An incidence member 141 through which a light enters is a slit or a pinhole. In contrast, if a light from an optical fiber is dispersed, an output end of the optical fiber is fixed. The light from the incidence member 141 enters a dispersion element 130. The dispersion element 130 is a dispersion element shown in FIG. 5. It is preferable to dispose an optical system for collimating the light from the incidence member 141 between the incidence member 141 and the dispersion element 130.

A light of each wavelength dispersed by the dispersion element 130 converges on each detector of a detector array 143 by means of a transmission optical system 142. Thus, the spectral device shown in FIG. 9 is a transmission spectral device.

This spectral device is set up so that the angle $\Delta\theta$ between the cementing surface 102 and the reflecting diffraction optical surface 101 in the dispersion element 130 and an interval $\Delta\lambda$ between a wavelength that each adjacent detector of the detector array 143 receives satisfy Expression (2). With this, a detector on which ordinary light of a certain wavelength reaches does not coincident with a detector on which noise light of the same wavelength reaches because they are adjacent with each other or apart more than that from each other. Therefore, when light intensity is measured, the ordinary light and the noise light do not interfere with each other to cause intensity modulation.

Figure 11:
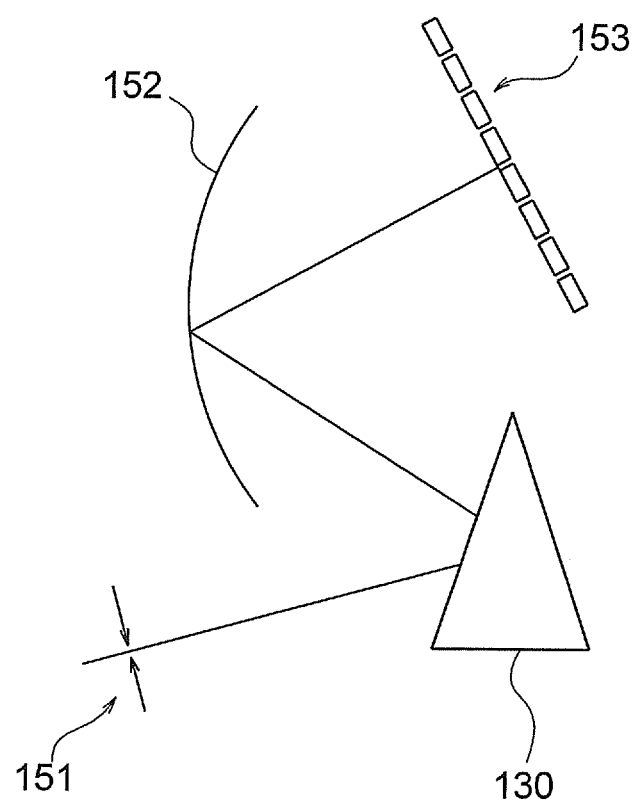
FIG. 11 is a schematic view of a configuration of a spectral device according to a modified example of the embodiment of the present invention.

Next, a modified example of a spectral device according to an embodiment is explained with reference to FIG. 11. FIG. 11 is a schematic view of a configuration of a spectral device according to a modified example according to the embodiment.

In the spectral device shown in FIG. 11, a light of each wavelength dispersed by a dispersion element 130 converges at a point on each detector of a detector array different from that of the spectral device shown in FIG. 10. Configuration and arrangement of an incidence member 151, a dispersion element 130, and a detector array 153 are similar to the corresponding components of the spectral device shown in FIG. 10.

Also in this spectral device, by setting up the angle $\Delta\theta$ between the cementing surface 102 and the reflecting diffraction optical surface 101 in the dispersion element 130 and the interval $\Delta\lambda$ between wavelength that each adjacent detector of the detector array 143 receives satisfy Expression (2), it is possible to prevent a phenomenon that the ordinary light interferes with the noise light to cause intensity modulation.

Figure 12:
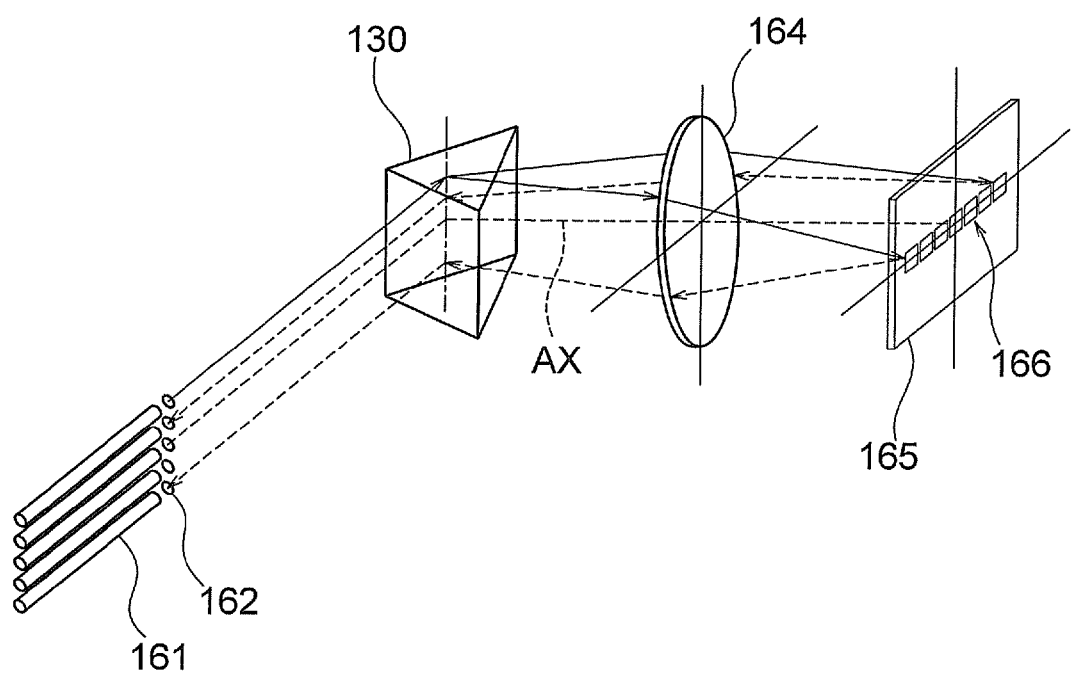
FIG. 12 is a schematic view of a configuration of a wavelength selective switch that includes a dispersion element according to the embodiment of the present invention.
Figure 13:
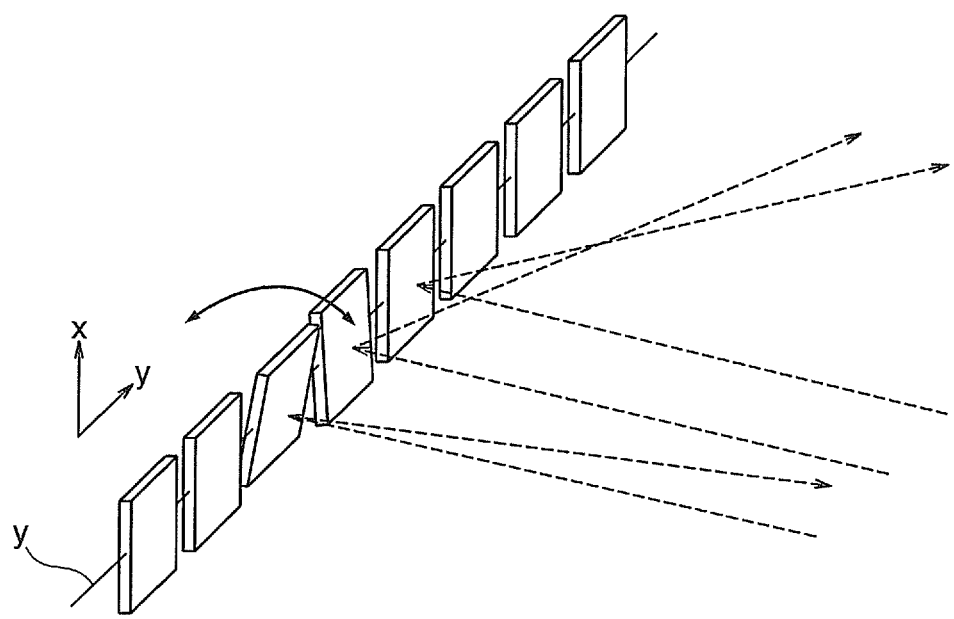
FIG. 13 is a perspective view of a configuration of a micro mirror array provided with a wavelength selective switch according to the embodiment of the present invention.

Next, a wavelength selective switch according to an embodiment is illustrated with reference to FIGS. 12 and 13. FIG. 12 is a schematic view of a configuration of a wavelength selective switch that includes a dispersion element according to an embodiment. FIG. 13 is a perspective view of a configuration of a micro mirror array provided with the wavelength selective switch according to the embodiment.

The wavelength selective switch shown in FIG. 12 is a so-called transmission wavelength selective switch. This wavelength selective switch includes a fiber array 161 composed of a plurality of optical fibers, a micro lens array 162, a dispersion element 130, and a MEMS mirror array 165 that is a MEMS module (Micro Electro Mechanical Systems module). The dispersion element 130 is a dispersion element shown in FIG. 5.

Each optical fiber in the fiber array 161 and each micro lens in the micro lens array 162 are arranged in pairs. These pairs are arranged in an array. The fiber array 161 functions as both an input member and an output member. A wavelength-multiplexed signal light is output from an optical fiber (hereafter, called as "first optical fiber") as the input member to the dispersion element 130. The light output from the optical fiber is transformed into a parallel light beam by the micro lens array 162.

The light output from the micro lens array 162 enters the dispersion element 130. The dispersion element 130 disperses the wavelength-multiplexed light in a zonal shape.

A lens 164 functions a light collecting element, and leads the light dispersed by the dispersion element 130 to a predetermined position for each wavelength of the MEMS mirror array 165 that is a light deflection member.

The MEMS mirror array 165, which is a MEMS module, includes a plurality of micro mirrors 166, each of which corresponds to the light of each wavelength dispersed by the dispersion element 130 in a zonal shape, respectively (see FIG. 13).

The micro mirrors 166, each of which can rotate around local x-axis and y-axis, reflects incident light in a direction different from the incident direction by mainly a rotation around the y-axis. The y-axis is a direction in which the mirrors are arranged, and the x-axis is perpendicular to the y-axis in the plane of the mirrors.

The lights reflected by the plurality of micro mirrors 166 of the MEMS mirror array 165, when the traveling direction thereof differs from the incident direction and direct the same D direction with each other, are coupled by the lens 164 on the dispersion element 130 to become again the same light beam with multi-wavelength components after diffracted by the dispersion element 130.

In contrast, among the lights reflected by the micro mirrors 166, lights reflected in a direction different from both the incident direction and the D direction are relayed and diffracted by the lens 164 on the dispersion element 130, but not coupled with the lights reflected in the D direction.

The lights reflected by the micro mirrors 166 enter different fibers, i.e. the fiber other than the input member of the fiber array 161. The fiber (second optical fiber) into which light enters functions as the output member.

As described above, it is possible to make the light with multi-wavelength components, which is output from the first optical fiber, selectively enters other fibers depending on the respective tilt angles of the micro mirrors 166 of the MEMS mirror array 165 for each wavelength.

In addition, in this example, a case when lights from one light input portion are coupled with a plurality of the light output portions is explained, but it is also possible to couple the lights from a plurality of the light input portions into a one light output portion.

In the wavelength selective switch shown in FIG. 12, the interval between the micro mirrors 166 is made to correspond to the difference Δλ of the wavelength of light resolved by the dispersion element 130. When the angle Δθ between the cementing surface 102 and the reflecting diffraction optical surface 101 in the dispersion element 130 satisfies Expression (2), a micro mirror at which the ordinary light hits is not the same as a micro mirror at which the noise light hits. Furthermore, even if these micro mirrors face the same direction, angles of incidence to the dispersion element 130 in the return trips after reflected by the micro mirrors 166 are different between the ordinary light and the noise light. For this reason, after the noise light passes the dispersion element 130, the noise light does not overlap with the optical path toward micro mirrors, and does not return up to the fiber array 161. Therefore, the ordinary light does not overlap with the noise light to cause interference, resulting in causing intensity modulation.

In addition, in the wavelength selective switch according to the embodiment, the lens 164 is disposed between the dispersion element 130 and the MEMS mirror array 165 as a transmission optical system; however, it is permissible to arrange a reflection optical system in place of the transmission optical system.

Figure 14:
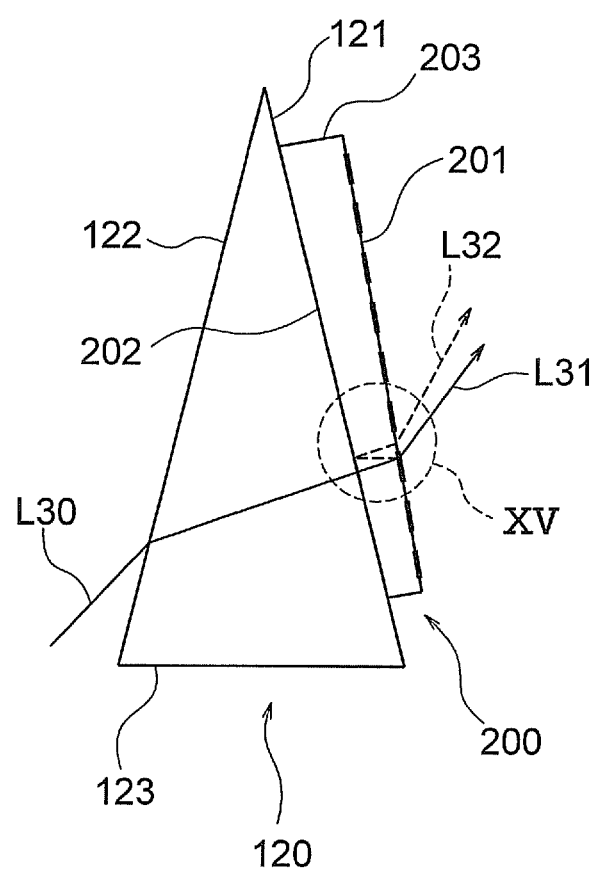
FIG. 14 is a schematic view showing how a light travels inside a dispersion element according to the modified example of embodiment of the present invention.
Figure 15:
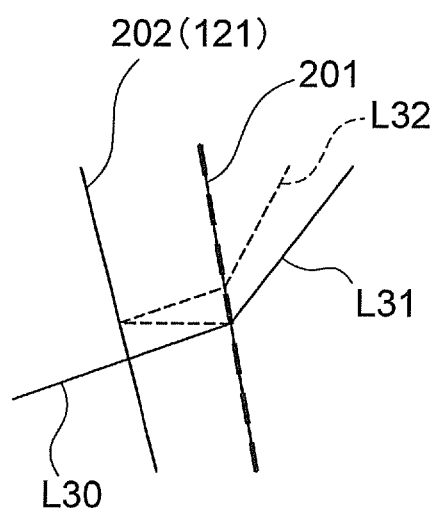
FIG. 15 is an enlarged schematic view of a part XV shown in FIG. 14.
Figure 16:
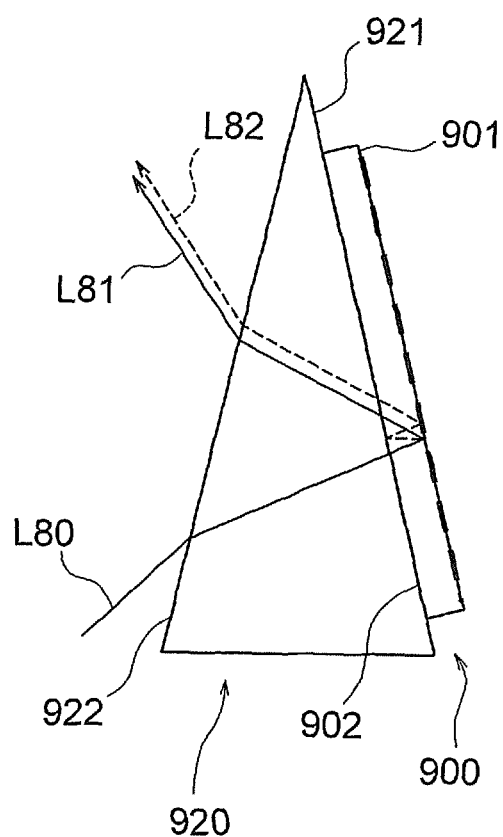
FIG. 16 is a schematic view showing how a light travels inside a conventional dispersion element.
Figure 17:
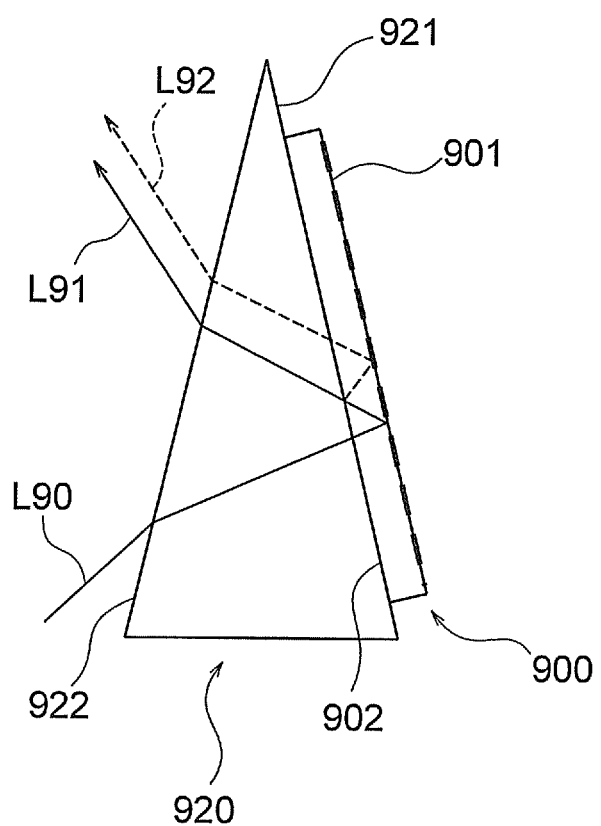
FIG. 17 is another schematic view showing how a light travels inside a conventional dispersion element.

Next, another modified example of a dispersion element according to the embodiment is illustrated with reference to FIGS. 14 and 15. FIG. 14 is a schematic view showing how a light travels inside a dispersion element according to the modified example of the embodiment. FIG. 15 is an enlarged schematic view of a part XV shown in FIG. 14.

In the dispersion element 130 shown in FIG. 5, the chip 100 having the reflecting diffraction optical surface 101 is employed; however, it is permissible to use a chip 200 having a transmitting diffraction optical surface 201 as shown in FIGS. 14 and 15. This dispersion element uses the same prism 120 as shown in FIG. 4.

The chip 200 is made of a medium having transmissivity, and machined in a shape so that a first plane 201 and a second plane 202 (third transmission surface) are non-parallel with each other and they come closer as they get away from a bottom plane 203. On the first plane 201, similar to the grooves 112 of the chip 100, grooves that are parallel to each other (not shown) are formed. In addition, the second plane 202 is polished so that the plane makes a predetermined tilt angle relative to an axis parallel to the grooves on the chip 200. Thus, the chip 100 is wedge-shaped (see FIG. 14).

In the dispersion element shown in FIG. 14, a light ray L30 entering from the second plane 122, which is the transmission surface of the prism 120, passes through the second plane 202, which is the cementing surface of the chip 200, and separates into a diffracting component L31 (solid line) and a regularly reflecting component L32 (broken line) on the first plane 201, which is a transmitting diffraction optical surface of the chip 200. Hereinafter, the diffracting component L31 is called as an ordinary light. The ordinary light L31 is output from the first plane 201 to the outside of the immersion grating without returning to the prism 120.

The component L32 regularly reflected on the transmitting diffraction optical surface 201 and separated from the ordinary light L31 is called as a noise light. A part of the noise light L32 is further reflected on the cementing surface 202. This reflected component L32 again travels toward the transmitting diffraction optical surface 201. The most part of the component L32 falling on the transmitting diffraction optical surface 201 is further diffracted thereat, and output to the outside of the immersion grating from the transmitting diffraction optical surface 201.

As described above, the noise light L32 is regularly reflected two more times compared with the ordinary light L31. Because the cementing surface 202 at which specular reflection occurs two times and the transmitting diffraction optical surface 201 are not parallel, the output angles of the ordinary light L31 and the noise light L32 from the transmitting diffraction optical surface 201 are different from each other. Therefore, even if these lights are collected by some optical means such as a lens, which is not shown, they converge at different points after they are output. For this reason, because the ordinary light L31 and the noise light L32 do not overlap, intensity modulation does not occur.

In the embodiments and the modified examples described above, examples of which a wedge shaped optical element (chip) and a prism are cemented to each other are explained; however, a dispersion element of the present invention can also take a form that a wedge shaped transmission grating (optical element) is sandwiched between two prisms to cement them with each other.

As described above, the dispersion element according to the present invention is useful in a spectral device and a wavelength selective switch in which it is desirable that the output light does not cause intensity modulation when wavelength is changed.

The dispersion element, the spectral device, and the wavelength selective switch according to the present invention achieve an advantageous affect that output light does not cause intensity modulation when wavelength is changed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A dispersion element comprising:
   a prism having a first transmission surface and an oppositely disposed second transmission surface; and
   an optical element having a third transmission surface and an oppositely disposed diffraction optical surface on which a diffraction grating is arranged,
   wherein the prism and the optical element are integrated into one body by cementing the first transmission surface to the third transmission surface, and
   the third transmission surface and the diffraction optical surface are non-parallel to each other in a plane perpendicular to grooves of the diffraction grating,
   wherein an angle Δθ between the third transmission surface and the diffraction optical surface satisfies Expression (1):
   $\lambda/(nW) < \Delta\theta < \alpha$ (1) where, $\lambda$ is wavelength in use, n is a refractive index of a medium of the optical element, W is an effective length in a direction perpendicular to the grooves on the diffraction optical surface, and $\alpha$ is an apex angle of the prism.

2. The dispersion element according to claim 1, wherein the dispersion element is embodied in a spectral device comprising:
   an input member through which a light enters;
   a plurality of light receiving members corresponding to respective wavelengths of lights dispersed by the dispersion element; and
   an optical system arranged between the dispersion element and the light receiving members, wherein the dispersion element is arranged at a light output side of the input member.

3. The dispersion element according to claim 1, wherein the dispersion element is embodied in a wavelength selective switch comprising:
   at least one input member that inputs a wavelength-multiplexed light in the wavelength selective switch;
   a light collecting member that collects a light of each dispersed wavelength;
   a light deflection member having a plurality of deflection elements capable of deflecting the light of each wavelength from the light collecting member independently for each wavelength; and
   an output member that receives the light of each wavelength deflected by the light deflection member,
   wherein the dispersion element receives the light from the input member and disperses the light.

4. A dispersion element comprising:
   a prism having a first transmission surface and an oppositely disposed second transmission surface; and
   an optical element having a third transmission surface and an oppositely disposed diffraction optical surface on which a diffraction grating is arranged,
   wherein the prism and the optical element are integrated into one body by cementing the first transmission surface to the third transmission surface, and
   the third transmission surface and the diffraction optical surface are non-parallel to each other in a plane perpendicular to grooves of the diffraction grating,
   wherein an angle $\Delta\theta$ between the third transmission surface and the diffraction optical surface satisfies Expression (2):
   $|(m\Delta\lambda)/(nd)|<\Delta\theta<\alpha$ (2) where, m is a diffraction order of a diffraction caused by the optical element, $\Delta\lambda$ is a difference of wavelength resolved by the dispersion element, n is a refractive index of a medium of the optical element, d is a pitch of grooves formed on the optical element, and $\alpha$ is an apex angle of the prism.

5. The dispersion element according to claim 4, wherein the dispersion element is embodied in a spectral device comprising:
   an input member through which a light enters;
   a plurality of light receiving members corresponding to respective wavelengths of lights dispersed by the dispersion element; and
   an optical system arranged between the dispersion element and the light receiving members,
   wherein the dispersion element is arranged at a light output side of the input member.

6. The dispersion element according to claim 4, wherein the dispersion element is embodied in a wavelength selective switch comprising:
   at least one input member that inputs a wavelength-multiplexed light in the wavelength selective switch;
   a light collecting member that collects a light of each dispersed wavelength;
   a light deflection member having a plurality of deflection elements capable of deflecting the light of each wavelength from the light collecting member independently for each wavelength; and
   an output member that receives the light of each wavelength deflected by the light deflection member,
   wherein the dispersion element receives the light from the input member and disperses the light.

7. A spectral device comprising:
   an input member through which a light enters;
   a dispersion element arranged at a light output side of the input member, the dispersion element comprising:
      a prism having a first transmission surface and an oppositely disposed second transmission surface, and
      an optical element having a third transmission surface and an oppositely disposed diffraction optical surface on which a diffraction grating is arranged, the optical element and the prism are integrated into one body by cementing the first transmission surface to the third transmission surface, and the third transmission surface and the diffraction optical surface are non-parallel to each other in a plane perpendicular to grooves of the diffraction grating;
   a plurality of light receiving members corresponding to respective wavelengths of lights dispersed by the dispersion element; and
   an optical system arranged between the dispersion element and the light receiving members.

8. A wavelength selective switch comprising:
   at least one input member that inputs a wavelength-multiplexed light in the wavelength selective switch;
   a dispersion element that receives the light from the input member and disperses the light, the dispersion element comprising:
      a prism having a first transmission surface and an oppositely disposed second transmission surface, and
      an optical element having a third transmission surface and an oppositely disposed diffraction optical surface on which a diffraction grating is arranged, the optical element and the prism are integrated into one body by cementing the first transmission surface to the third transmission surface, and the third transmission surface and the diffraction optical surface are non-parallel to each other in a plane perpendicular to grooves of the diffraction grating;
   a light collecting member that collects a light of each dispersed wavelength;
   a light deflection member having a plurality of deflection elements capable of deflecting the light of each wavelength from the light collecting member independently for each wavelength; and
   an output member that receives the light of each wavelength deflected by the light deflection member.

* * * * *